Patented Mar. 6, 1945

2,370,719

UNITED STATES PATENT OFFICE 2,370,719

PROCESS FOR SEPARATING 2,3,6-TRI-METHYL PHENOL AND 2-METHYL-4-ETHYL PHENOL

Aldo De Benedictis and Daniel B. Luten, Jr., Berkeley, Calif., assignors to Shell Development Company, San Francisco, Calif., a corporation of Delaware No Drawing. Application October 27, 1943, Serial No. 508,090

15 Claims. (Cl. 260—624)

The present invention is a continuation-in-part of the co-pending application, Serial No. 421,120, filed December 1, 1941, now U. S. Patent 2,336,720, issued December 14, 1943, and relates to a process for recovering 2,3,6-trimethyl phenol and 2-methyl-4-ethyl phenol from petroleum and coal tar sources. More particularly, it relates to a process for recovering these phenols from phenolic fractions derived from petroleum or coal tar which latter are usually recovered therefrom by extraction with a caustic alkali solution followed by subsequent "springing" with a stronger acid, for example, carbon dioxide, hydrogen sulfide, sulfuric acid, etc. to liberate the phenols, which are recovered by phase separation, extraction with organic solvents, distillation, etc.

Our co-pending application Serial No. 421,120, filed December 1, 1942, deals with a method for preparing 2,3,6-trimethyl phenol from fractions having an A. S. T. M. 5% to 95% boiling range of about 220° to 230° C. by monosulfonating them, treating the resulting sulfonated mixture with an aqueous solution of a water-soluble salt of ammonia or a metal of the alkali or alkaline earth group, whereby a precipitate is formed. This precipitate, which comprises predominantly 2,3,6-trimethyl phenol metal sulfonate, is hydrolyzed and the liberated alkyl phenol is recovered from the hydrolyzed mixture. The present invention deals with the separation of 2,3,6-trimethyl phenol from fractions containing, in addition, 2-methyl-4-ethyl phenol, which latter compound is apt to contaminate 2,3,6-trimethyl phenol when present, owing to the similarities in most of their properties. In particular this invention deals with a convenient and novel method for separating relatively pure 2-methyl-4-ethyl phenol and 2,3,6-trimethyl phenol from sulfonated mixtures thereof, as hereinafter more fully described.

In the past it has been supposed that substituted phenols of the di-ortho type remained in hydrocarbon fractions which were extracted with caustic alkali because these phenols are known to have relatively low acidities which were expected to prevent their forming compounds with caustic alkali. It has been discovered that this apparently is not true; that, for some reason, perhaps due to a solutizing effect of other dissolved phenols, 2,3,6-trimethyl phenol is in fact extracted from the hydrocarbons normally associated therewith by various caustic alkali solutions along with other phenols, including 2-methyl-4-ethyl phenol. Further, it has been discovered it is possible to prepare these two compounds in a pure state from such mixtures.

2,3,6-trimethyl phenol is a useful intermediate in organic synthesis. It is particularly useful as an intermediate employed in the synthesis of vitamin E. 2-methyl-4-ethyl phenol also has utility as an intermediate in organic synthesis.

The boiling temperature of 2,3,6-trimethyl phenol is reported in the literature to be 219° C., and apparently this explains one reason why it has heretofore never been reported as a constituent of coal tar phenols. It has been discovered that, unexpectedly, 2,3,6-trimethyl phenol accumulates preferentially in fractions boiling from about 220° to 230° C., along with 2-methyl-4-ethyl phenol and other phenols having normal boiling temperatures within this range.

In carrying out our process we prefer preparing from a hydrocarbon or coal tar phenolic mixture a fraction having an A. S. T. M. 5 to 95% boiling range of about 215° to 230° C. respectively or narrower, preferred 217° to 225° C., sulfonating this mixture under conditions to form phenol monosulfonic acids, then treating the resulting sulfonated mixture with an aqueous solution of a water-soluble salt of ammonia or metal selected from the group including alkali metals and alkaline earth metals. Under these circumstances the 2,3,6-trimethyl phenol sulfonic acid, together with 2-methyl-4-ethyl phenol, forms relatively insoluble salts which readily separate from the residual soluble material. If desired, the unsulfonated residue may be separated from the sulfonation product prior to treatment with the water-soluble salts. The resulting mixture of salts of 2,3,6-trimethyl phenol and 2-methyl-4-ethyl phenol is subjected to hydrolysis whereby the 2,3,6-trimethyl phenol is substantially completely hydrolyzed and separated first, followed by hydrolysis (usually at higher temperature) and recovery of 2-methyl-4-ethyl phenol. These phenols regenerated upon hydrolysis can be conveniently separated from their respective hydrolysis mixtures by extraction with a water-immiscible organic solvent for phenols, or by steam distillation.

The step of preparing the fraction from the mixture of phenols of wider boiling range is conveniently carried out by fractional distillation under ordinary atmospheric pressure, although if desired fractionation at other pressures may be employed. The fraction treated by the process may have a breadth in terms of A. S. T. M. 5 to 95% points as wide as from 215° C. to 230° C. (although it is preferred to treat a narrower boiling fraction, e. g. one having A. S. T. M. 5 to 95% points of about 7° C. apart or less). If wider boiling fractions are treated, difficulty is usually encountered owing to the presence of phenols other than 2,3,6-trimethyl phenol and 2-methyl-4-ethyl phenol, which sometimes tend to separate with them and which make the preparation of a pure product exceedingly difficult, since no convenient method is available for their separation.

The sulfonation step is conveniently carried out with sulfuric acid or other sulfonating acid, such as chlorosulfonic acid. When employing sulfuric acid, amounts from one to 1.5 mol equivalents of sulfuric acid per mol equivalent of phenol at room temperature gives satisfactory sulfonation, although in certain cases larger ratios of sulfonating acid to phenols may be used. However, sometimes it may be preferable to use less acid, for example, when the fraction to be treated is known to contain appreciable quantities of phenols which are known to sulfonate with considerable difficulty, such as 2,4,6-trimethyl phenol or 2,3,5-trimethyl phenol. In other words, under these circumstances less acid serves to monosulfonate the 2,3,6-trimethyl phenol and 2-methyl-4-ethyl phenol, and the unsulfonated residue can be easily removed prior to treatment with the water-soluble salt. In this manner a saving of reagents may be effected. The sulfonation step may be carried out at any temperature between about 0° and 130° C. However, we have found that atmospheric temperature is ordinarily convenient. Temperatures above 130° C. tend to give polysulfonation and decomposition, and therefore are best avoided.

The sulfonation product including 2,3,6-trimethyl and 2-methyl-4-ethyl phenol sulfonic acids may be separated from unsulfonated residue by extraction with a water-immiscible organic solvent or by other means if desired, although this step is not usually necessary. For example, if desired the sulfonation product may be treated with a substantially water-immiscible inert solvent such as petroleum ether, gasoline, naphtha, pentane, hexane, benzene, toluene, chlorinated or fluorinated hydrocarbons; monohydric alcohols of 5 or more carbon atoms, as n-amyl alcohol, various hexanols including cyclohexanol, heptanols, octanols; ethers, as di-isopropyl ether, di-normal propyl ethers, di-butyl ethers, di-amyl ethers; ketones as di-ethyl ketone, methyl propyl ketones, methyl butyl ketones, di-propyl ketones, di-butyl ketones, di-amyl ketones; amines such as $C_6$ and higher primary, secondary or tertiary mono amines, etc. to separate it into a hydrocarbon-soluble unsulfonated residue and a water-soluble sulfonated mixture, and the latter may be further treated according to our process. Preferred water-insoluble solvents are normally liquid hydrocarbons boiling below about 200° C.

If the resulting separated phenol sulfonic acids contain other phenol sulfonic acids in addition to the 2,3,6-trimethyl and 2-methyl-4-ethyl phenol sulfonic acids, which usually is the case, then it is desirable to separate the last two specifically mentioned phenol sulfonic acids from the sulfonated mixture. As indicated before, this separation may be effected by treating the sulfonated mixture with an aqueous solution of a salt of an alkali or alkali earth-metal or ammonia. With these solutions the 2,3,6-trimethyl phenol and 2-methyl-4-ethyl phenol sulfonic acids form insoluble salts which may readily be removed as a precipitate from the other sulfonic acids which may be present and which remain in solution.

The salt solution should be at least 25% saturated and preferably 60% to 90% saturated. It is preferred not to use solutions which are substantially completely saturated because such solutions tend to deposit salt crystals other than the sulfonic acid salts, although this is not too serious an objection since the former are eliminated in the subsequent hydrolysis step. The above treatment and separation may be carried out in acid, neutral or even alkaline solutions. Acid solutions result in somewhat more complete separation and therefore are preferred.

Salts which may be employed for this treatment and separation are water-soluble salts (i. e. which are at least about 10% water-soluble at the temperature at which precipitation is initiated) of ammonia and metals of the alkali metal and alkaline earth group with various inorganic or organic (preferably water-soluble) acids, such as sulfuric, hydrochloric, hydrobromic, phosphoric, nitric, formic, acetic, etc. Example of such salts include, for example, sodium chloride, sodium sulfate, potassium chloride, calcium chloride, barium nitrate, barium chloride, etc. Although any water-soluble salt as described above may be employed, it is preferred to employ bisulfates of ammonium, sodium, or potassium, and in particular potassium acid sulfate, because their application permits a regenerative process to be employed.

When a substantially pure mixture of 2,3,6-trimethyl and 2-methyl-4-ethyl phenol sulfonic acids or their salts has been obtained, it may be further separated into its components by selective hydrolysis which is carried out by heating the mixture in a strongly acid solution. It has been found that the 2,3,6-trimethyl and 2-methyl-4-ethyl phenol sulfonic acids hydrolyze at different rates under the same conditions, the 2,3,6-trimethyl phenol hydrolyzing more quickly. Accordingly, these phenols may be separated by carefully controlling various conditions during their hydrolysis, particularly the time or temperature or both.

The hydrolysis may be carried out either batchwise or continuously. One method of effecting the selective hydrolysis is to heat the mixture of 2,3,6-trimethyl phenol and 2-methyl-4-ethyl phenol sulfonic acids in a strong acid solution and from time to time cool the solution and extract the hydrolyzed product with a suitable water-immiscible solvent, of the type mentioned above. The resulting several extracts will contain different concentrations of the 2,3,6-trimethyl phenol and 2-methyl-4-ethyl phenol, the 2,3,6-trimethyl phenol being in relatively high concentration in the first few extracts while the 2-methyl-4-ethyl phenol will be in relatively high concentration in the later produced extracts.

The exact time required for the hydrolysis varies with the temperature and the acidity maintained during the hydrolysis. The higher the temperature and the acidity the more rapidly the hydrolysis proceeds. For example, when using sulfuric acid as the hydrolytic medium a solution of 30% free $H_2SO_4$ at a temperature of about 107±3° C. is convenient. However, acid concentrations from 10% to 70% and reaction temperatures from 40 to 150° C. may be employed with good results. After most of the 2,3,6-trimethyl phenol has been hydrolyzed and separated under these conditions, the temperature and/or concentration of the acid may be increased to speed up the hydrolysis of the 2-methyl-4-ethyl phenol sulfonic acid which has the slower rate of hydrolysis. Usually the temperature of the reaction is increased a few degrees, preferably at least about 5 or 10° C. However, an increase in the temperature is not essential for the hydrolysis of the remainder of the mixture.

The degree to which the hydrolysis is allowed to proceed in making the several fractions of the hydrolyzed product in this stepwise operation depends primarily upon which phenol it is desired to prepare in the purest condition. If it is desired to produce the 2,3,6-trimethyl phenol in a relatively pure form, it is necessary to remove the first hydrolyzed fraction before an appreciable quantity of 2-methyl-4-ethyl phenol has hydrolyzed. In order to insure this, a portion of the more easily hydrolyzable 2,3,6-trimethyl phenol sulfonic acid may be left unhydrolyzed. On the other hand, if the primary consideration is the production of 2-methyl-4-ethyl phenol in a state of high purity, the hydrolysis is best interrupted only after a portion of the more difficulty hydrolyzable 2-methyl-4-ethyl phenol has hydrolyzed to insure that little or no 2,3,6-trimethyl phenol remains unhydrolyzed.

In case it is desired to produce both phenols in pure condition the initial hydrolysis is best carried out under the conditions described above, wherein the product is removed before all the 2,3,6-trimethyl phenol is hydrolyzed. The liberated phenol is distilled or extracted and the residual product further maintained under conditions favorable to further hydrolysis until substantially all the residual 2,3,6-trimethyl phenol and a part of the 2-methyl-4-ethyl phenol has hydrolyzed; the second hydrolyzate is separated. The residue upon further hydrolysis yields substantially pure 2-methyl-4-ethyl phenol. The mixture obtained in the second extraction comprises 2,3,6-trimethyl phenol and 2-methyl-4-ethyl phenol which may be recycled to the sulfonating step to be further treated in accordance with the process to separate further quantities of these phenols in pure condition.

The most convenient manner for separating these phenols is to steam distill the hydrolytic mixture. In this case the 2,3,6-trimethyl phenol is distilled overhead, provided the distillation is rapid enough to keep pace with the hydrolysis, so that hydrolyzed products are removed as they are formed and do not accumulate and become mixed in the hydrolyzer. As the distillation proceeds, both the distillation temperature (at constant vapor pressure) and the concentration of the acid in the solution gradually rise. Both these factors tend to increase the rate of hydrolysis and thus take care automatically and counteract the natural tendency towards slowing down of the hydrolysis as it proceeds. Should it be desired, however, to reduce the rate of hydrolysis, then water or steam or both may be added to the mixture while distilling. An advantage of this method is that the time at which the hydrolysis of the 2,3,6-trimethyl phenol is more or less complete and the hydrolysis of the 2-methyl-4-ethyl phenol begins is very easily determined. At this point the rate of distillation materially lessens and the melting point of the alkyl phenol layer below the condensed steam in the distillate drops.

This steam distillation may be carried out either continuously in a specially designed reactor from which both 2,3,6-trimethyl phenol and 2-methyl-4-ethyl phenol may be continuously withdrawn, or in batch. The temperature, the concentration of acid and flow rate of the mixture through reactor must be carefully and critically maintained in order to obtain pure products. This can only be done provided the mixture of phenol sulfonic acids fed to the reactor is of a constant composition.

A sure way of determining when the hydrolysis of the 2,3,6-trimethyl phenol sulfonic acid is nearing completion is to determine the melting points of the product. The melting point of the distillate or extract drops to about 50° C. or below when the 2-methyl-4-ethly appears in the hydrolyzed product. When the melting point is about 25° C., it contains about equal quantities of both phenols. From this time on, continued hydrolysis yields predominantly the remaining 2-methyl-4-ethyl phenol having a melting point below about 5° C.

Accordingly, if it is desired to produce relatively pure 2,3,6-trimethyl phenol, the cut point should be made to correspond to a melting point of the hydrolyzed product not below about 50° C. If on the other hand relatively pure 2-methyl-4-ethyl phenol is desired, the cut point should correspond to a melting point not above about 5° C. In the case of a compromise, a cut point between these limits, say about 25° C. melting point, may be convenient. The fraction having melting points between about 50° C. and 5° C. may if desired be re-sulfonated and rehydrolyzed in accordance with this invention.

The following specific example clearly illustrates the separation which may be obtained by hydrolysis by the steam distillation method.

*Example*

80 grams of a 1:1 mixture of 2,3,6-trimethyl phenol and 2-methyl-4-ethyl phenol was sulfonated with 80 grams of 96% sulfuric acid. To this mixture 80 grams of potassium acid sulfate was added along with sufficient water and sulfuric acid to make up a solution of the potassium salts in 500 grams of 25% sulfuric acid. This was done to simulate the conditions under which these mixtures would be encountered if separated by the method disclosed in our co-pending application Serial No. 421,120. The solution was thereupon distilled in batch to effect the hydrolysis.

The hydrolysis temperature was maintained at about 107° C. until almost all of the 2,3,6-trimethyl phenol had been steam distilled. At this point hydrolysis slowed down, hence the temperature was increased to 113° C. and further rapid hydrolysis occurred. Fractions of the distillate were made to separate as nearly as possible cuts differing substantially in composition and yet of sufficient quantity to enable their analysis. Nine such separate fractions were taken overhead throughout the distillation. Their compositions are shown in the table below. It will be noticed that there is a definite transition between fractions number 5 and 7. Fraction 6 showed a tendency to remain liquid at room temperature while all the material collected in the previous fractions crystallized immediately upon cooling. The final fraction was too small for analysis but may be considered to have the same composition as the fraction immediately preceding it.

| Description of cut | Wt. of cut, g. | Melting point,[1] °C. | Composition of cut | | | |
|---|---|---|---|---|---|---|
| | | | 2,3,6-trimeth-ylphenol | | 2-methyl-4-ethylphenol | |
| | | | Per cent | Grams | Per cent | Grams |
| Charge | 80.0 | | 50.0 | 40.0 | 50.0 | 40.0 |
| Cut, 1+2[2] | 21.7 | 39.2 | 63 | 13.8 | 37 | 7.9 |
| Cut 3 | 5.4 | 50.4 | 80 | 4.3 | 20 | 1.1 |
| Cut 4 | 3.8 | 54.2 | 86 | 3.3 | 14 | 0.5 |
| Cut 5 | 12.3 | 54.2 | 86 | 10.6 | 14 | 1.7 |
| Cut 6 | 7.5 | 26.8 | 48 | 3.6 | 52 | 3.9 |
| Cut 7 | 11.8 | 2.2 | 10 | 1.2 | 90 | 10.6 |
| Cut 8 | 5.4 | 3.8 | 6 | 0.3 | 94 | 5.1 |
| Cut 9 | 1.5 | 3.8 | 6 | 0.1 | 94 | 1.4 |
| Not hydrolyzed and loss | 10.6 | | | 2.8 | | 7.8 |

[1] Actually there are two melting points, a lower one at which the eutectic melts, and a higher one at which those crystals melt which are present in excess of the eutectic. The above melting point figures refer to the higher melting point.

[2] The sulfonated charge contained some unsulfonated phenols most of which came over in the first two cuts. This explains the relatively low melting point and high content of 2-methyl-4-ethyl phenol of cuts 1 and 2.

We claim as our invention:

1. A process for separating a mixture of 2,3,6-trimethyl phenol and 2-methyl-4-ethyl phenol comprising the steps of sulfonating said mixture under conditions to produce monosulfonic acids of said phenols without forming substantial quantities of polysulfonic acids, maintaining the resulting sulfonic acids in a hydrolytic medium under hydrolyzing conditions, whereby phenols are liberated, the melting points of which decrease from above 50° C. to below 5° C. with progressive hydrolysis, and separating at least one of two phenol fractions having melting points above about 50° C. and below about 5° C. respectively.

2. A process for separating a mixture of 2,3,6-trimethyl phenol and 2-methyl-4-ethyl phenol comprising the steps of sulfonating said mixture under conditions to produce monosulfonic acids of said phenols without forming substantial quantities of polysulfonic acids, maintaining the resulting sulfonic acids in a hydrolytic medium under hydrolyzing conditions, whereby phenols are liberated, the melting points of which decrease from above 50° C. to below 5° C. with progressive hydrolysis, and separating at least three phenol fractions having melting points above 50° C., between 50° C. and 5° C., and below 5° C. respectively.

3. The process of claim 2, wherein the 50° C. to 5° C. melting fraction is re-cycled to the sulfonating step.

4. A process for separating a mixture of 2,3,6-trimethyl phenol and 2-methyl-4-ethyl phenol comprising the steps of sulfonating said mixture under conditions to produce monosulfonic acids of said phenols without forming substantial quantities of polysulfonic acids, maintaining the resulting sulfonic acids in a hydrolytic medium under hydrolyzing conditions, whereby phenols are liberated, the melting points of which decrease from above 50° C. to below 5° C. with progressive hydrolysis, and separating at least one phenol fraction having a melting point between about 50° C. and 5° C.

5. A process for separating a mixture of 2,3,6-trimethyl phenol and 2-methyl-4-ethyl phenol comprising the steps of sulfonating said mixture under conditions to produce monosulfonic acids of said phenols without forming substantial quantities of polysulfonic acids, maintaining the resulting sulfonic acids in a hydrolytic medium under hydrolyzing conditions for a time to liberate a first phenol fraction having a melting point above about 5° C., separating said liberated fraction, further hydrolyzing the remaining sulfonic acids to liberate a second phenol fraction having a melting point lower than that of the first, and separately recovering it.

6. A process for separating 2,3,6-trimethyl phenol from 2-methyl-4-ethyl phenol contained in a mixture with other alkyl phenols, comprising the steps of sulfonating said mixture under conditions to produce monosulfonic acids of said phenols without forming substantial quantities of polysulfonic acids, treating said sulfonic acids with an aqueous solution of a water-soluble salt selected from the group consisting of salts of ammonium, alkali metals and alkaline earth-metals of sufficient concentration to form a precipitate of the corresponding salts of said phenolsulfonic acids, separating said precipitate, maintaining it in a hydrolytic medium under hydrolyzing conditions, whereby phenols are liberated, the melting points of which decrease from above 50° C. to below 5° C. with progressive hydrolysis, and separating at least one of two phenol fractions having melting points above about 50° C. and below about 5° C. respectively.

7. The process of claim 6, wherein said mixture is derived from petroleum alkyl phenols.

8. The process of claim 6, wherein the original mixture has a 5 to 95% A. S. T. M. boiling range between about 215° and 230° C.

9. The process of claim 6, wherein the original mixture has a 5 to 95% A. S. T. M. boiling range between about 217° C. and 225° C.

10. A process for separating a mixture of 2,3,6-trimethyl phenol and 2-methyl-4-ethyl phenol, comprising the steps of sulfonating said mixture under conditions to produce monosulfonic acids of said phenols without forming substantial quantities of polysulfonic acids, hydrolyzing the resulting sulfonic acids in a hydrolytic medium at a temperature of 107° C.±3° C. for a time to liberate a first phenol fraction having a melting point not below about 5° C., separating the liberated fraction, continuing hydrolysis at a higher temperature to hydrolyze residual sulfonic acids, whereby a second phenol fraction is produced having a lower melting point than the first, and separating said second fraction.

11. The process of claim 10, wherein the temperature of hydrolysis to liberate the first and second fractions differs by at least 5° C.

12. A process for separating a mixture of 2,3,6-trimethyl phenol and 2-methyl-4-ethyl phenol, comprising the steps of sulfonating said mixture under conditions to produce monosulfonic acids of said phenols without forming substantial quantities of polysulfonic acids, subjecting the resulting sulfonic acids to a steam distillation from a hydrolytic medium whereby phenols are removed overhead whose melting points decrease from above 50° C. to below 5° C. with progressive distillation, and recovering at least one of two phenol fractions having melting points above about 50° C. and below about 5° C. respectively.

13. A process for separating a mixture of 2,3,6-trimethyl phenol and 2-methyl-4-ethyl phenol, comprising the steps of sulfonating said mixture under conditions to produce monosulfonic acids of said phenols without forming substantial quantities of polysulfonic acids, subjecting the resulting sulfonic acids to steam distillation from a hydrolytic medium maintained at a temperature not above 110° C., whereby phenols are taken overhead whose melting points decrease from above 50° C. to below 5° C. with progressive distillation, recovering a first phenol fraction having a melting point above about 5° C., increasing the temperature of the hydrolytic medium to at least 113° C., further subjecting residual sulfonic acids to steam distillation, and recovering a second phenol fraction having a melting point lower than that of the first.

14. A process for separating a mixture of 2,3,6-trimethyl phenol and 2-methyl-4-ethyl phenol comprising the steps of sulfonating said mixture under conditions to produce monosulfonic acids of said phenols without forming substantial quantities of polysulfonic acids, maintaining the resulting sulfonic acid in a hydrolytic medium under hydrolyzing conditions whereby phenols are liberated, the melting points of which decrease from above 50° C. to below 5° C. with progressive hydrolysis, interrupting the hydrolysis at a point when the melting point of the liberated phenols is above about 5° C., extracting the liberated phenols with a water-insoluble solvent, and further hydrolyzing residual sulfonic acids.

15. The process of claim 14, wherein said solvent is a hydrocarbon solvent having a boiling point below about 200° C.

ALDO DE BENEDICTIS.
DANIEL B. LUTEN, Jr.